Patented July 5, 1927.

1,634,793

UNITED STATES PATENT OFFICE.

MICHAEL G. MINAEFF, OF BROOKLYN, NEW YORK, ASSIGNOR, BY MESNE ASSIGNMENTS, TO THE LARVEX CORPORATION, OF BROOKLYN, NEW YORK, A CORPORATION OF NEW YORK.

ART OF MOTHPROOFING.

No Drawing.    Application filed July 17, 1925.  Serial No. 44,362.

This invention is a moth proofing composition and method of preparing the same, and it is adapted for use either on the unfabricated materials, such as wool, woolen yarns, piece goods, etc., or on the fabricated articles such as clothing, general garments, etc. It is especially adapted for use, however, on articles which it is not practical or feasible to treat by immersion, but which require to be sprayed or treated in some analogous way, by the moth proofing agent or solution. The composition overcomes the disadvantages inherent in prior compositions when employed to treat materials which are difficult to wet by spraying or similar treatment due to the water repellant action of such materials.

The composition forming the subject matter of this invention not only possesses the advantages adverted to, but, also, satisfies all the general criteria of a moth proofing composition, in that it is simple and economical to manufacture, does not soil or otherwise act detrimentally on the materials treated, the materials to be moth proofed do not have to be subjected to any preliminary treatment, the treated materials do not have to be washed, and, moreover, the moth proofing effects are permanent.

Practically all of the moth proofing compositions of the prior art, so far as I am aware, do not readily penetrate, i. e., are not readily adsorbed, by the materials to be treated, particularly in closely woven or hard finished goods, but have a tendency to roll off or evaporate without thoroughly impregnating the fibers, due, probably, to the surface tension of the materials.

From a more definite standpoint, the salient aim of the present invention is a moth proofing composition embodying an ingredient or agent, which, possibly or probably, through diminution of the interfacial tension or other physical effect, or by some chemical action on the fiber, or both, enhances, facilitates and expedites the absorption and adsorption of the composition. In other words, the said agent overcomes the resistance of the fibers to becoming wet by the composition, thereby increasing the wetting rate and thus enabling the composition to more readily and thoroughly penetrate the materials and produce uniform and maximum distribution of the composition throughout the fibers of the material. Manifestly, the condition thus produced by said wetting agent greatly enhances the efficiency of the moth proofing or immunizing process.

Speaking generally, the composition, in its entirety, embodies, in its preferred form, a moth proofing or toxic agent, such as a complex fluoride, say, e. g., sodium silico fluoride, a suitable aluminum salt, such as common alum, and the wetting agent, the function of which has been described, consisting of a sulphonated derivative of the saturated or unsaturated fatty acids, such as the sulphonated derivatives of ricinoleic acid, of oleic acid, of olive oil, of cottonseed oil, or of linseed oil, the preferred wetting agent, because of its ready availability, economy and efficient action, being "Turkey red oil" and a stabilizing agent, such as gelatine.

Typical of the preferred composition, in its entirety, is the following:

| | Per cent. |
|---|---|
| Sodium silicofluoride ca | 0.6 |
| Alum ca | 0.3 |
| Gelatine | 0.02 |
| Turkey red oil | 0.02 |

The preferred method of mixing or combining the ingredients is as follows:

Dissolve the crystalloids, that is the sodium silicofluoride and alum in the entire volume of water necessary for the desired concentration, let it settle, and decant the clear liquid. This constitutes a crystalloidal solution.

Prepare a gelatine solution by dissolving gelatine in the proportion of 20 grams of gelatine to 100 cubic centimeters of hot water, to which has been added hydrochloric acid in the quantity of 2.5 cc. of concentrated hydrochloric acid (ca. 38%) for each 100 grams of gelatine.

The gelatine solution, prepared in the manner described is brought to a temperature of about 45° C., and Turkey red oil is added thereto and thoroughly mixed therewith in the quantity equal to the weight of gelatine in the solution.

After the oil is added, and without permitting the liquid to solidify, it is poured with vigorous stirring into water which has been previously heated to about 50° C. The quantity of water must be sufficient to have the colloids, Turkey red oil and gelatine, ultimately in the concentration of ca. 2% in regard to each component. I term this a colloidal solution.

This colloidal solution is then gradually added at a temperature of approximately 40° C. with agitation, to the clear crystalloidal solution prepared as above, and also having a temperature of approximately 40° C. The ultimate concentration of colloids is then 0.02% of each component, that is, the colloidal solution is used in the ratio of one part per 100 parts of the crystalloidal solution.

I prefer to use a Turkey red oil, the $P_h$ of which is approximately 5.9 in a 1% solution, and a gelatine whose $P_h$ is substantially 6.0 in a 1% solution before the hydrochloric acid is added.

It will be understood, however, that the invention, in its broad aspect, is not restricted to the specific formula set forth, either in whole or in part, nor to the proportions of ingredients specified, nor is it exclusive of reasonable modifications of treatment or in the use of equivalents, but is as broadly novel as is commensurate with the appended claims.

As suggested above, the composition may be used for its intended purposes in any of the ways generally practised.

Having thus fully described the invention, what I claim as new and desire to secure by Letters Patent is:

1. A moth proofing composition containing a sulphonated derivative of a fatty acid capable of enhancing the wetting power of said composition.

2. A moth proofing composition containing Turkey red oil to enhance the wetting power of said composition.

3. A moth proofing composition containing a toxic agent and a sulphonated derivative of a fatty acid capable of enhancing the wetting power of said composition.

4. A moth proofing composition containing sodium silico fluoride and Turkey red oil to enhance the wetting power of said composition.

5. A moth proofing composition containing a toxic agent, a sulphonated derivative of a fatty acid capable of enhancing the wetting power of said composition, and an aluminum salt.

6. A moth proofing composition containing sodium silico fluoride, alum, and Turkey red oil to enhance the wetting power of said composition.

7. A moth proofing composition containing a toxic agent, a sulphonated derivative of a fatty acid capable of enhancing the wetting power of said composition, an aluminum salt, and a stabilizing agent.

8. A moth proofing composition containing sodium silico fluoride, alum, gelatine, and Turkey red oil enhance the wetting power of said composition.

In testimony whereof I have signed the foregoing specification.

MICHAEL G. MINAEFF.